United States Patent [19]
Shibata et al.

[11] Patent Number: 5,790,267
[45] Date of Patent: Aug. 4, 1998

[54] COMMUNICATIONS METHOD

[75] Inventors: Tetsuya Shibata; Tetsuya Nishino, both of Osaka, Japan

[73] Assignee: Mita Industrial Co., Ltd., Osaka, Japan

[21] Appl. No.: 400,812

[22] Filed: Mar. 8, 1995

[30] Foreign Application Priority Data

Mar. 14, 1994 [JP] Japan .................................. 6-042381

[51] Int. Cl.$^6$ ............................................ H04N 1/00
[52] U.S. Cl. .......................... 358/437; 358/434; 358/436; 395/113
[58] Field of Search .................. 358/434, 437, 358/400, 404, 435, 407, 436, 438, 439; 379/100.01; 395/113

[56] References Cited

U.S. PATENT DOCUMENTS

| | | | |
|---|---|---|---|
| 4,712,139 | 12/1987 | Kato | 358/404 |
| 5,073,827 | 12/1991 | Nakajima | 358/400 |
| 5,081,539 | 1/1992 | Kaneko | 358/437 |
| 5,227,894 | 7/1993 | Yoshida | 358/441 |
| 5,237,428 | 8/1993 | Tajitsu et al. | 358/437 |
| 5,311,327 | 5/1994 | Fukushima | 358/444 |
| 5,541,984 | 7/1996 | Yoshida | 379/354 |
| 5,644,405 | 7/1997 | Sato | 358/404 |

FOREIGN PATENT DOCUMENTS

| | | | |
|---|---|---|---|
| 59-0103452 | 6/1984 | Japan | 358/437 |
| 59-0103462 | 6/1984 | Japan | |
| 59-0463462 | 6/1984 | Japan | 358/437 |
| 2065559 | 3/1990 | Japan | H04M 11/00 |
| 2185164 | 7/1990 | Japan | H04N 1/32 |
| 4008056 | 1/1992 | Japan | H04N 1/21 |
| 4013368 | 1/1992 | Japan | H04N 1/32 |

*Primary Examiner*—Edward L. Coles
*Assistant Examiner*—Madeleine AV Nguyen
*Attorney, Agent, or Firm*—Beveridge, DeGrandi, Weilacher & Young, LLP

[57] ABSTRACT

A communications method is provided for performing a rational priority processing according to the urgency of an interrupt transmission when an interrupt transmission command is supplied while a multi-address communication or a multi-polling reception is performed. The priority order of the processings is decided based on whether the interrupt command requests a direct transmission or a memory transmission. When the interrupt is the direct transmission, the interrupt is given priority. When the interrupt is the memory transmission, the multi-address communication or the multi-polling reception is given priority. In the interrupt transmission requesting the memory transmission, after an original for the interrupt transmission is read out and stored in a memory, the multi-address communication or the multi-polling reception is continued, and after the communication is completed, the data of the original for the interrupt transmission stored in the memory is transmitted.

11 Claims, 2 Drawing Sheets

COMMUNICATIONS METHOD

BACKGROUND OF THE INVENTION

1. Field of the Invention

The present invention relates to a priority processing method suitable for a case where an interrupt transmission is requested while a multi-address communication or a multi-polling reception is performed.

2. Description of the Prior Art

Conventional facsimile communications methods include a memory transmission and a direct transmission. In the memory transmission, like the transmission reservation, an original is read out and the image data of the original is stored in an image memory prior to the transmission, and the image stored in the image memory is transmitted at need. In the direct transmission, the image data of an original is transmitted while the original is being read out. Thus, the direct transmission does not require a large-capacity memory such as the image memory.

As modes of facsimile transmission, a multi-address communication and a multi-polling reception are used. The multi-address communication is one mode of the memory transmission. The image data of an original are stored in the image memory and the stored image data are successively transmitted to a plurality of receivers. In the multi-polling reception, reception is performed by supplying a transmission instruction from the receiving side to a plurality of facsimile apparatuses on the transmitting side. To perform the direct transmission, an original is set in advance on the facsimile apparatus on the transmitting side and the original is read out and transmitted in accordance with a transmission instruction from the receiving side. To perform the memory transmission, an image data stored in the image memory is transmitted in accordance with a transmission instruction.

When another transmission process interrupts while data are successively transmitted to different receivers according to the multi-address communication or data are successively received according to the multi-polling reception, conventionally, the interrupt processing is given priority over the multi-address communication or the multi-polling reception irrespective of the contents of the interrupt processing. This method is based on the consideration that interrupt processings are frequently urgent.

In actuality, however, the interrupt processings have many modes according to the operators' intentions and are not always very urgent. Therefore, it is not always rational to give priority to any interrupt processings over the multi-address communication and the multi-polling reception.

SUMMARY OF THE INVENTION

An object of the present invention is to provide a rational communications method which meets operators' requirements by giving priority only to an urgent interrupt transmission and giving priority to the multi-address communication and the multi-polling reception when the interrupt transmission is not urgent.

To achieve the above-mentioned object, according to the present invention, the priority order of the processings is decided based on whether the interrupt transmission command supplied while the multi-address communication or the multi-polling reception is performed requests a direct transmission or a memory transmission. When the interrupt is a direct transmission, the interrupt is given priority. When the interrupt is a memory transmission, the multi-address communication or the multi-polling reception is given priority.

In the interrupt transmission requesting the memory transmission, after an original for the interrupt transmission is read out and stored in the memory, the multi-address communication or the multi-polling is continued, and after the communication is completed, the data of the original for the interrupt transmission stored in the memory is transmitted.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
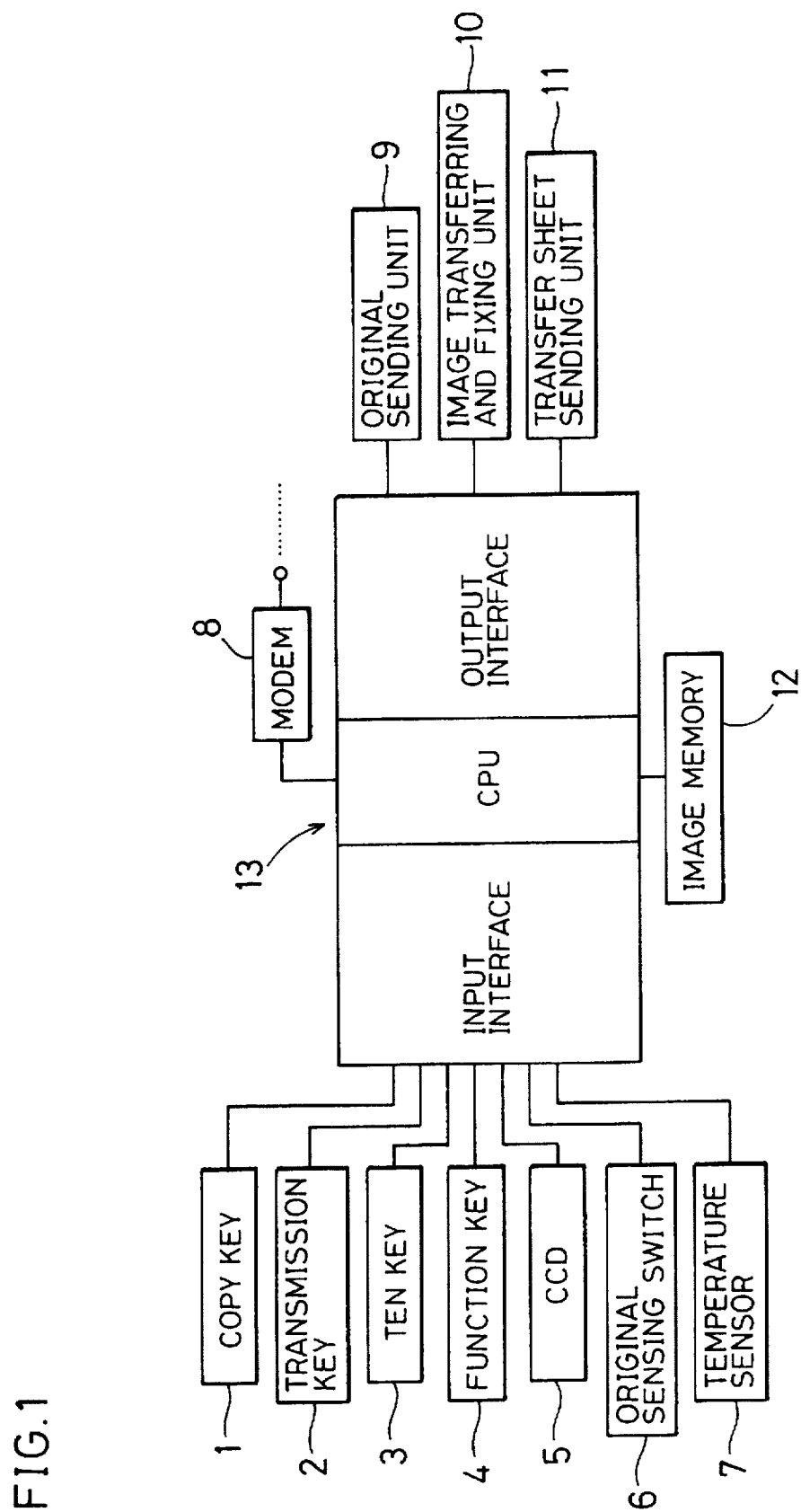
FIG. 1 is a block diagram showing the arrangement of a facsimile apparatus employing a communications method of the present invention.

Referring to FIG. 1, there is shown the arrangement of the hardware of a facsimile apparatus employing the present invention. The facsimile apparatus is provided with a control unit 13 including a central processing unit (CPU). The control unit 13 is connected to the public telephone line through a modem 8. To an input interface of the CPU, the following are connected: a copy key 1; a transmission key 2; a ten key 3 for inputting numbers such as telephone numbers; function keys 4 for specifying functions such as a multi-calling communication and a memory transmission; a charge coupled device (CCD) 5 constituting an original reading unit; an original sensing switch 6 for sensing that an original is placed on an original stand; and a temperature sensor 7 for detecting the temperature of a fixing roller. To an output interface, an original sending unit 9, an image transferring and fixing unit 10 and a transfer sheet sending unit 11 are connected. To the CPU, an image memory 12 is connected for storing original image data read out by the CCD 5.

Figure 2:
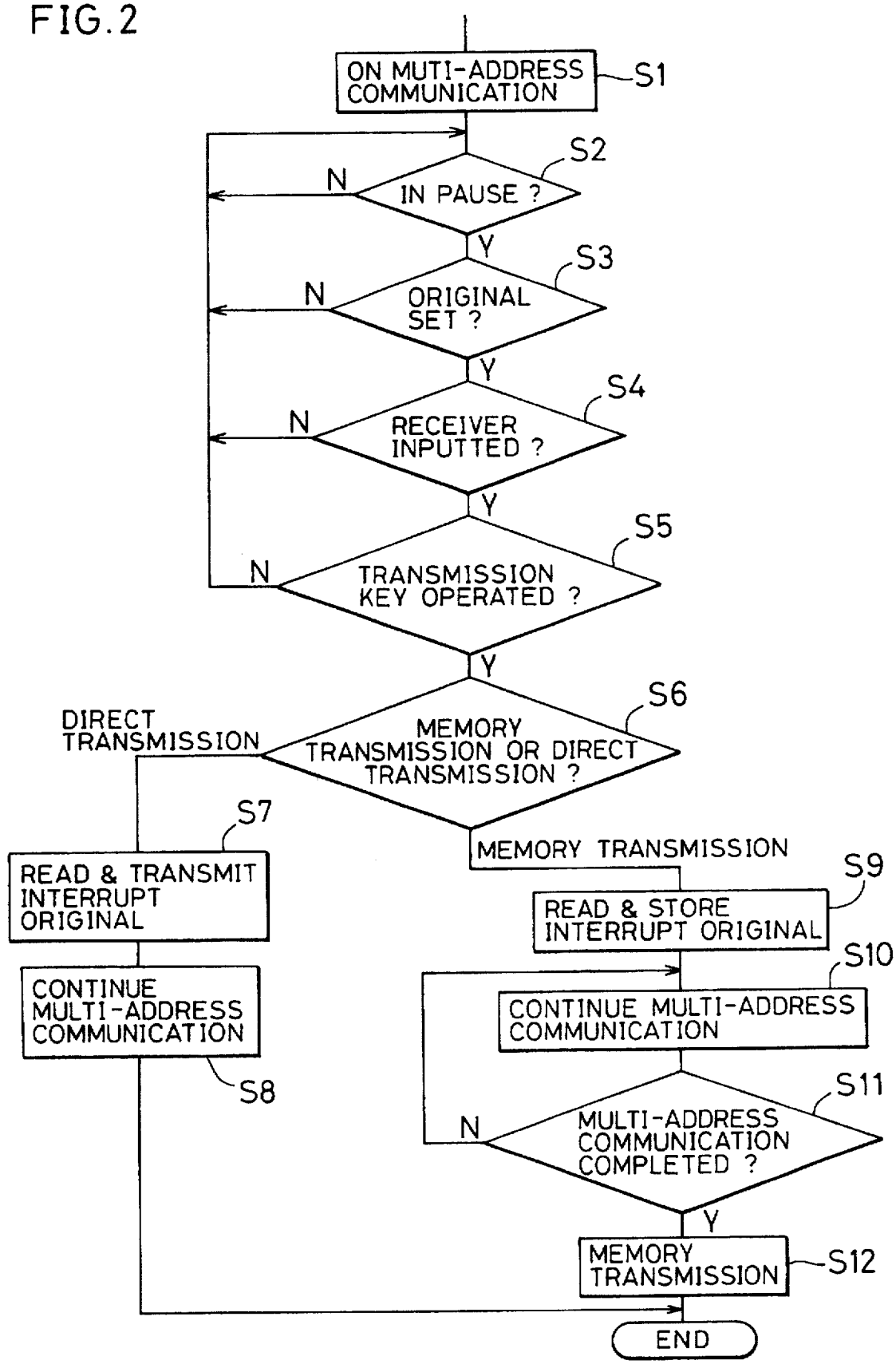
FIG. 2 is the flowchart of an interrupt processing performed in the multi-address communication according to the communications method of the present invention.

The processing of an interrupt transmission performed when the facsimile apparatus of the above-described arrangement is performing a multi-address communication will be described with reference to the flowchart of FIG. 2. FIG. 2 shows a part of the main program executed by the control unit 13. This processing starts while a multi-address communication is performed (S1). The CPU is always monitoring whether the multi-address communication is in pause or not, i.e. whether the receiver is changed or not (S2). When the multi-address communication is in pause, whether an original is set on the original stand or not is sensed by the original sensing switch 6 (S3).

When an original is set, whether the telephone number of the receiver of the original is inputted from the ten key 3 or not is determined (S4), and whether the transmission key 2 is operated or not is determined (S5). The CPU determines that there is an interrupt when the transmission key 2 is operated, and then, the CPU determines whether the interrupt requests the memory transmission or the direct transmission (S6). This determination is made based on whether or not one key for specifying the memory transmission among the function keys 4 is operated to set a memory transmission mode. When the memory transmission mode is not set, it is determined that the interrupt requests the direct transmission.

In the direct transmission, as described previously, the image data of an original is transmitted while the original is read out. Therefore, when the direct transmission is requested in the middle of the multi-address communication, it is considered that the transmission is very urgent and that the operator wishes to perform the transmission immediately. For this reason, when the direct transmission is requested, the interrupt processing is given priority like in the conventional method and the image data of the original is transmitted while the original is read out (S7). The multi-address communication is resumed after the interrupt transmission is finished (S8).

On the other hand, in the memory transmission, the original image data is stored in the image memory and transmitted later. Therefore, when the memory transmission is requested, it is considered that the operator is not in a great hurry for the transmission. For this reason, when the memory transmission is requested, the multi-address communication is given priority. Specifically, first, an original set on the original stand is read out and stored in the image memory 12 (S9) and the multi-address communication is continued (S10). After the multi-address communication is finished (S11), the memory transmission of the interrupt transmission is performed (S12). When the memory transmission is accompanied by a transmission reservation, the memory transmission is performed at the reservation time.

The above-described processing is employable for an interrupt transmission performed while the multi-polling reception is performed. In this case, when a transmission command is supplied to the facsimile apparatus on the receiving side (corresponding to S2 of FIG. 2) while the multi-polling reception is performed (corresponding to S1), whether an original for an interrupt transmission is set on the original stand or not is determined (S3). Then, whether the receiver's telephone number is inputted or not (S6) and whether the transmission key 2 is operated or not (S5) are determined. Then, whether the interrupt requests the memory transmission or the direct transmission is determined (S6).

When the direct transmission is requested, after the interrupt transmission is performed (S7), the multi-polling reception is continued (corresponding to S8). When the memory transmission is requested, the original is read out and stored in the image memory 12 (S9) and the multi-polling reception is continued (corresponding to S10). Then, after the multi-polling reception is completed (corresponding to S11), the memory transmission of the interrupt transmission is performed (S12).

Thus, according to the present invention, since the start time of an interrupt transmission requested in the middle of the multi-address communication or the multi-polling reception is decided based on whether the interrupt is the direct transmission or the memory transmission, the operator can select the start time of the interrupt transmission based on the urgency of the transmission, so that the communication is performed in a rational way.

In particular, when the interrupt transmission processing of the present invention is employed while the multi-polling reception is performed, since the reception is given priority over a not very urgent interrupt transmission, it is prevented that the receiver is forced in a transmission waiting state for an unnecessarily long time.

Obviously, many modifications and variations of the present invention are possible in light of the above teachings. It is therefore to be understood that within the scope of the appended claims, the invention may be practiced other than as specifically described.

What is claimed is:

1. A communications method where an interrupt transmission command is supplied while a multi-address communication in which the same information is successively transmitted to a plurality of receivers designated beforehand is being performed, wherein when the interrupt transmission is a memory transmission, the multi-address communication is given priority until the multi-address communication is completed, and when the interrupt transmission is a direct transmission, the interrupt transmission is given priority.

2. A communications method where an interrupt transmission command is supplied while a continuous communication with a plurality of apparatuses designated beforehand is being performed, wherein when the interrupt transmission is a direct transmission in which image data of an original are transmitted while the original is read out, the interrupt transmission is given priority, and when the interrupt transmission is a memory transmission in which communication data read out from an original are stored in a memory and the stored data are transmitted, the continuous communication with the plurality of apparatuses is given priority until the continuous communication with the plurality of apparatuses is completed.

3. A communications method according to claim 2, wherein when the interrupt transmission is the memory transmission, the continuous communication with the plurality of apparatus is temporarily halted while the communication data are read out from an original and stored in the memory, after the communication data are read out from an original and stored in the memory, the continuous communication with the plurality of apparatuses is resumed, and after the continuous communication with the plurality of apparatuses is finished, the communication data stored in the memory are transmitted.

4. A communications method according to claim 2, wherein the interrupt transmission command is received between communication with one apparatus of the plurality of apparatuses and communication with another apparatus of the plurality of apparatuses.

5. A communications method according to claim 4, wherein when the interrupt transmission is the direct transmission, after the interrupt transmission is performed, the continuous communication with the plurality of apparatuses is resumed, and when the interrupt transmission is the memory transmission, the continuous communication with the plurality of apparatus is temporarily halted while the communication data are read out from an original and stored in the memory, after the communication data are read out from an original and stored in the memory, the continuous communication with the plurality of apparatuses is resumed, and after the continuous communication with the plurality of apparatuses is finished, the communication data stored in the memory is transmitted.

6. A communications method according to claim 5, wherein said continuous communication with the plurality of apparatuses is a multi-address communication.

7. A communications method according to claim 5, wherein said continuous communication with the plurality of apparatuses is a multi-polling reception.

8. A facsimile apparatus which reads and stores image data of an original and which sequentially performs a transmission of the stored image data to each of a plurality of receivers, comprising:

detecting means for detecting, while the sequential transmissions are being performed, an operation requesting transmission of image data of another original to a receiver, and discriminating a mode of the requested transmission between a direct transmission in which image data of the another original are read and transmitted immediately to the receiver, and a memory transmission in which image data of the another original are read, stored and transmitted to the receiver at a later time; and controlling means for performing the requested transmission during a temporary halt of the sequential transmissions when the mode of the requested transmission is the direct transmission, and for performing the requested transmission after completion of all the sequential transmissions when the mode of the requested transmission is the memory transmission.

9. A facsimile apparatus according to claim 8, wherein when the mode of the requested transmission is the memory transmission, said controlling means reads and stores the image data of the other original during a temporary halt of the sequential transmissions.

10. A facsimile apparatus which sequentially performs a reception of image data from each of a plurality of transmitters by providing instructions thereto, comprising:

detecting means for detecting, while the sequential receptions are being performed, an operation requesting transmission of image data of an original to a receiver, and discriminating a mode of the requested transmission between a direct transmission in which image data of the original are read and transmitted immediately to the receiver, and a memory transmission in which image data of the original are read, stored and transmitted to the receiver at a later time; and controlling means for performing the requested transmission during a temporary halt of the sequential receptions when the mode of the requested transmission is the direct transmission, and performing the requested transmission after completion of all the sequential receptions when the mode of the requested transmission is the memory transmission.

11. A facsimile apparatus according to claim 10, wherein when the mode of the requested transmission is the memory transmission, said controlling means reads and stores the image data of the original during a temporary halt of the sequential receptions.

* * * * *